(12) United States Patent
Labelle (10) Patent No.: US 12,072,015 B2
(45) Date of Patent: Aug. 27, 2024

(54) BOLT THROUGH INTERMEDIATE SHAFT OF PARALLEL AXIS GEARBOX

(71) Applicants: LINAMAR CORPORATION, Guelph (CA); Chad Labelle, Livonia, MI (US)

(72) Inventor: Chad Labelle, Livonia, MI (US)

(73) Assignee: Linamar Corporation, Guelph (CA)

( * ) Notice: Subject to any disclaimer, the term of this patent is extended or adjusted under 35 U.S.C. 154(b) by 39 days.

(21) Appl. No.: 17/920,845

(22) PCT Filed: Apr. 26, 2021

(86) PCT No.: PCT/US2021/029068
§ 371 (c)(1),
(2) Date: Oct. 24, 2022

(87) PCT Pub. No.: WO2021/217114
PCT Pub. Date: Oct. 28, 2021

(65) Prior Publication Data
US 2023/0126628 A1    Apr. 27, 2023

Related U.S. Application Data

(60) Provisional application No. 63/014,816, filed on Apr. 24, 2020.

(51) Int. Cl.
*F16H 57/02*    (2012.01)
*F16H 57/021*    (2012.01)
(Continued)

(52) U.S. Cl.
CPC ......... *F16H 57/031* (2013.01); *F16H 57/021* (2013.01); *F16H 57/03* (2013.01); *F16H 57/037* (2013.01); *F16H 2200/0021* (2013.01)

(58) Field of Classification Search
CPC ...... F16H 57/021; F16H 57/028; F16H 57/03; F16H 57/031; F16H 57/037;
(Continued)

(56) References Cited

U.S. PATENT DOCUMENTS 4,223,570 A * 9/1980 Yamamori .............. F16C 25/06
475/71
4,231,622 A * 11/1980 Paullin ................... F16C 35/06
74/606 R
(Continued)

FOREIGN PATENT DOCUMENTS

CN    104024688 A * 9/2014 ............... F16H 1/04
CN    108708633 A * 10/2018 ............. E05B 15/00
(Continued)

OTHER PUBLICATIONS

Machine translation of WO 2019/228639 A1 obtained on Dec. 21, 2023.*

*Primary Examiner* — Adam D Rogers
(74) *Attorney, Agent, or Firm* — Miller Canfield (57) ABSTRACT

A parallel axis gearbox is provided for a vehicle. The parallel axis gearbox includes an input shaft having a first axis of rotation and an intermediate shaft having a second axis of rotation parallel to the first axis of rotation. The intermediate shaft includes an intermediate driving gear, an intermediate driven gear, and a longitudinal bore passing through the intermediate shaft. The intermediate driven gear is meshingly engaged with a first driving gear on the input shaft. The input shaft and the intermediate shaft are contained within and supported by a cover fixedly coupled to a housing. A bolt fixedly couples the cover to the housing and passes through the longitudinal bore of the intermediate shaft.

18 Claims, 7 Drawing Sheets

(51) Int. Cl.
*F16H 57/031* (2012.01)
*F16H 57/03* (2012.01)
*F16H 57/037* (2012.01)

(58) Field of Classification Search
CPC ..... F16H 2057/0213; F16H 2057/0221; F16H 2200/0021
See application file for complete search history.

(56) References Cited

U.S. PATENT DOCUMENTS 9,951,850 B2     4/2018   Kramer et al.
10,837,537 B2 *   11/2020   Yoshimura ............ F16H 57/032

FOREIGN PATENT DOCUMENTS

| CN | 108944391 | | 9/2020 | | |
|----|-----------|---|--------|---|---|
| DE | 102008039476 A1 | * | 2/2010 | ........... | F16H 57/021 |
| GB | 589732 A | * | 6/1947 | | |
| WO | WO-2019228639 A1 | * | 12/2019 | ............... | B60K 1/00 |

* cited by examiner

BOLT THROUGH INTERMEDIATE SHAFT OF PARALLEL AXIS GEARBOX

CROSS-REFERENCE TO RELATED APPLICATIONS

This application claims priority to and all the benefits of U.S. Provisional Application 63/014,816, filed Apr. 24, 2020, and entitled "Bolt Through Intermediate Shaft of Parallel Axis Gearbox", the disclosure of which is hereby incorporated by reference in its entirety.

BACKGROUND OF THE INVENTION

1. Field of the Invention

The present invention relates an electric axle gearbox for a vehicle having a hollow intermediate shaft. More specifically, the present invention relates to an electric axle gearbox encased in a cover and a housing and including a hollow intermediate shaft wherein the cover is fixedly coupled to the housing through the hollow intermediate shaft.

2. Description of Related Art

Many vehicles today have an electric drive comprising an electric motor operatively coupled to an axle gearbox in lieu of and/or in addition to an internal combustion engine. An axle gearbox operatively coupled to an electric motor is generically described as an electric axle gearbox and/or an eAxle gearbox. The eAxle gearbox is typically operatively coupled to one or more wheels for propelling the vehicle.

One type of eAxle gearbox is a parallel axis gearbox. The parallel axis gearbox typically includes an input shaft, an intermediate shaft, a differential assembly, and a first and second output side shafts having respective axes of rotation that are parallel to one another. The input shaft is typically operatively coupled to an electric motor output shaft. In addition, the input shaft includes a first driving gear. Similarly, the intermediate shaft includes an intermediate driving gear. A first driven gear is fixedly coupled to the intermediate shaft and meshingly engaged with the driving gear on the input shaft. The first and second output side shafts are rotationally coupled through a differential assembly to an annular driven gear meshingly engaged with the intermediate driving gear.

Typically, the parallel axis gearbox includes a cover fixedly coupled to a housing to contain and support the internal components of the parallel axis gearbox. A plurality of mechanical fasteners are typically spaced around an outer perimeter of the cover to attach the cover to the housing. The cover has increased axial stiffness near the mechanical fasteners. However, the cover is typically less stiff in portions of the cover spaced apart from the mechanical fasteners. Since the cover and the housing contain and support the internal components of the gearbox, a reduction in stiffness of the cover in the axial direction of the intermediate shaft can result in increased deflections of the cover under load. Flexing of the cover under load can result in mesh misalignments between the meshed gears within the parallel axis gearbox. Further, each of the input shaft, the intermediate shaft, and the differential assembly are supported by bearings. The bearings can be misaligned due to deflections in the cover under load. Misalignments between meshed gears within the parallel axis gearbox increases the wear on the gears and reduce the durability of the gears. In addition, bearing misalignments increases bearing wear and further degrade the durability of the bearings.

Certain parallel axis gearboxes include an intermediate shaft having a longitudinal bore extending at least partially through the intermediate shaft. The intermediate shafts having a longitudinal bore are alternatively described as hollow intermediate shafts.

Typically, the intermediate shaft is positioned spaced apart from the outer perimeter of cover for the parallel axis gearbox. U.S. Pat. No. 9,951,850 generally discloses a first known parallel axis gearbox having an input shaft, an intermediate shaft, and a first and second output side shafts having respective axes of rotation that are parallel to one another. The input shaft is operatively coupled to an electric motor output shaft. In addition, the input shaft includes a first driving gear. Similarly, the intermediate shaft includes an intermediate driving gear. A longitudinal bore extends partially through the intermediate shaft. A first driven gear is fixedly coupled to the intermediate shaft and meshingly engaged with the first driving gear on the input shaft. The first and second output side shafts are rotationally coupled through a differential assembly to an annular driven gear meshingly engaged with the intermediate driving gear.

The internal components of the first known parallel axis gearbox are supported by and contained within a cover and a housing. A plurality of mechanical fasteners attach the cover to the housing around an outer perimeter of the cover. However, the cover lacks mechanical fasteners near the intermediate shaft. The cover has reduced axial stiffness under load near the intermediate shaft since the mechanical fasteners are spaced around the outer perimeter of the cover.

The China patent 108944391 generally discloses a second known parallel axis gearbox also having an input shaft, an intermediate shaft, and a first and second output side shafts having respective axes of rotation that are parallel to one another. The input shaft is operatively coupled to an electric motor output shaft. In addition, the input shaft includes a first driving gear. Similarly, the intermediate shaft includes an intermediate driving gear. In addition, a longitudinal bore extends through the intermediate shaft. A first driven gear is fixedly coupled to the intermediate shaft and meshingly engaged with the first driving gear on the input shaft. The first and second output side shafts are rotationally coupled through a differential assembly to an annular driven gear meshingly engaged with the intermediate driving gear.

The housing of the second known parallel axis gearbox includes a first passageway opening for accessing the intermediate shaft and a second passageway opening for accessing the input shaft. Further, each of the first and second passageway openings are sealed by a respective first and second cover. An outer perimeter of each of the first and second covers are fastened to the housing by mechanical fasteners. The mechanical fasteners are spaced closer to the intermediate shaft in the second known parallel axis gearbox compared to the first known parallel axis gearbox. However, in the second known parallel axis gearbox, the first cover for the intermediate shaft can deflect under load. The first cover has reduced axial stiffness near the axis of rotation of the intermediate shaft since the mechanical fasteners are spaced around the outer perimeter of the first cover.

Therefore, it is desirable to reduce the potential for mesh misalignments within a parallel axis gearbox due to a cover over the intermediate shaft deflecting under load. Further, it is desirable to reduce the potential for bearing misalignments by reducing the potential for the cover to deflect under load. In addition, it is desirable to increase the stiffness of the cover in an axial direction of the intermediate shaft. Additionally, it is desirable to add a point of connection between the cover and the housing through the intermediate shaft. Finally, it is desirable to mechanically fasten the cover to the housing through a longitudinal bore passing through the intermediate shaft to increase the axial stiffness of the cover.

SUMMARY OF THE INVENTION

The present invention relates to a parallel axis gearbox for a vehicle. The parallel axis gearbox includes an input shaft having a first axis of rotation and an intermediate shaft having a second axis of rotation parallel to the first axis of rotation. The intermediate shaft includes an intermediate driving gear, an intermediate driven gear, and a longitudinal bore passing through the intermediate shaft. The intermediate driven gear is meshingly engaged with a first driving gear on the input shaft. The input shaft and the intermediate shaft are contained within and supported by a cover fixedly coupled to a housing. A bolt fixedly couples the cover to the housing and passes through the longitudinal bore of the intermediate shaft.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-3, 6, and 7 illustrate a parallel axis gearbox 10 having a bolt 14 fastening a cover 18 to a housing 22 through an intermediate shaft 26, according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
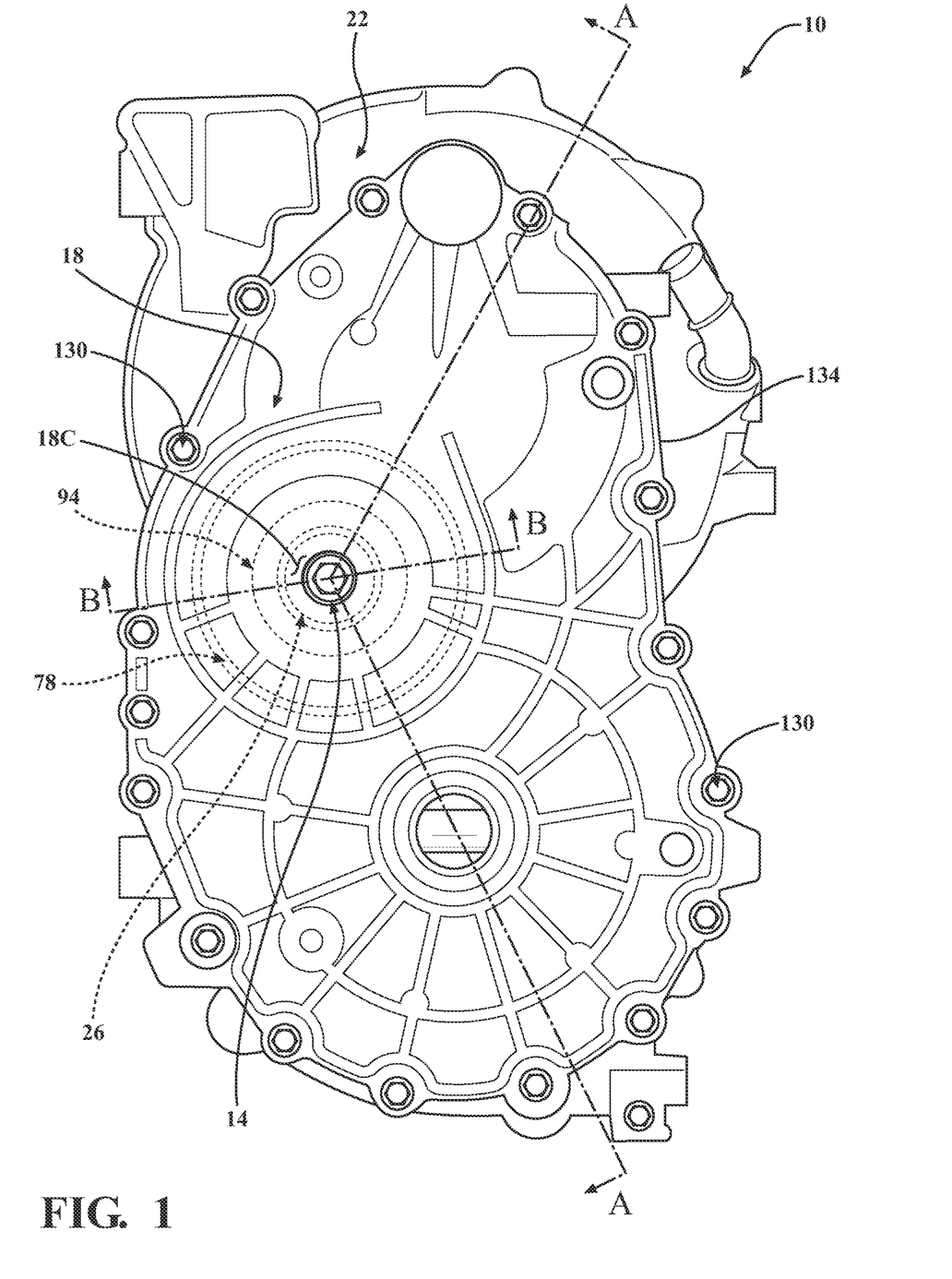
FIG. 1 is a partially transparent view of a parallel axis gearbox having an intermediate shaft supported and contained within a cover and a housing, illustrating a bolt passing through a longitudinal bore in the intermediate shaft and fixedly coupling the cover to the housing, according to one embodiment of the present invention.
Figure 2:
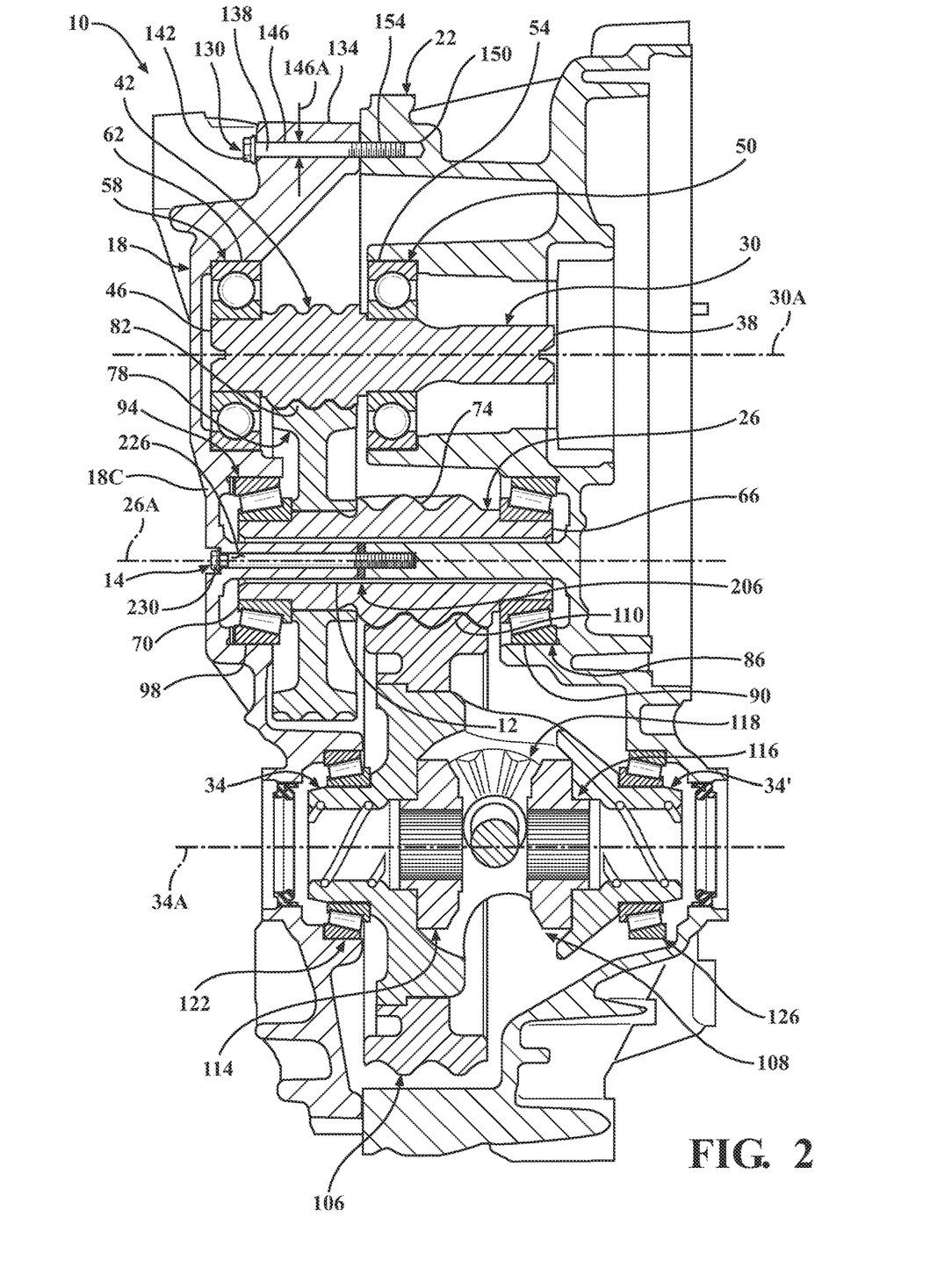
FIG. 2 is an aligned cross-sectional view of the parallel axis gearbox of FIG. 1 taken along section line A-A, illustrating a first embodiment of the present invention.

FIG. 1 shows a partially transparent view of the parallel axis gearbox 10 having an intermediate shaft 26 supported and contained within the cover 18 and the housing 22. An aligned cross-sectional view of the parallel axis gearbox 10 of FIG. 1 taken along section line A-A is shown in FIG. 2. Referring to FIG. 2, the parallel axis gearbox 10 includes an input shaft 30, the intermediate shaft 26, and first and second output side shafts 34, 34'. Each of the intermediate shaft 26, the input shaft 30, and the first and second output side shafts 34, 34' have axis of rotations 26A, 30A, 34A that are parallel to one another.

Referring to FIG. 2, the input shaft 30 has a first shaft end 38 configured to operately couple with a motor output shaft of an electric drive motor. In addition, the input shaft 30 includes an integrally formed driving gear 42 spaced apart from a second shaft end 46. In other embodiments, the driving gear 42 is a separate component that is fixedly coupled to the input shaft 30. The first shaft end 38 of the input shaft 30 is supported and retained by a lower bearing 50 located within a lower bearing cavity 54 in the housing 22. Similarly, the second shaft end 46 of the input shaft 30 is supported and retained by an upper bearing 58 located within an upper bearing cavity 62 formed in the cover 18. The lower and upper bearings 50, 58 supporting the input shaft 30 are shown as deep groove ball bearings, in FIG. 2. However, alternate types of bearings and bearing mounting locations can be used without varying the scope of the invention. For example, both the lower and upper bearings 50, 58 can be retained solely within the housing 22 if desired.

The intermediate shaft 26, shown in FIG. 2, includes a first shaft end 66, a second shaft end 70, an integrally formed intermediate driving gear 74 adjacent the first shaft end 66, and an intermediate driven gear 78 fixedly coupled to the intermediate shaft 26 adjacent the second shaft end 70. The intermediate driven gear 78 includes gear teeth 82 that are configured to meshingly engage with the driving gear 42 of the input shaft 30. Further, the intermediate driven gear 78 revolves around the intermediate shaft 26 axis of rotation 26A. The first shaft end 66 of the intermediate shaft 26 is supported and retained by a lower intermediate bearing 86 located in a lower bearing cavity 90 formed in the cover 18. Similarly, the second shaft end 70 of the intermediate shaft 26 is supported and retained by an upper intermediate bearing 94 located in an upper bearing cavity 98 formed in the cover 18. In the embodiment shown in FIG. 2, the lower and upper intermediate bearings 86, 94 are tapered roller bearings, however, other types of bearings, such as deep groove ball bearings and the like, can be used without altering the scope of the invention. In addition, the lower and upper intermediate bearings 86, 94 can be supported and retained within the housing 22 without altering the scope of the invention. Also shown in FIG. 2, the intermediate shaft 26 includes a longitudinal bore 102 extending between the first shaft end 66 and the second shaft end 70 and aligned with the axis of rotation 26A of the intermediate shaft 26. The intermediate shaft 26 having a longitudinal bore 102 is alternately described as a hollow intermediate shaft 26.

An annular driven gear 106 is operatively coupled between the intermediate driving gear 74 and a differential assembly 108, as illustrated in FIG. 2. The annular driven gear 106 revolves around the axis of rotation 34A of the first and second output side shafts 34, 34'. Further, the annular driven gear 106 includes gear teeth 110 configured to matingly engage with the intermediate driving gear 74. In the embodiment shown in FIG. 2, the annular driven gear 106 is fixedly coupled to the first output side shaft 34 with the second output side shaft 34' operately coupled to the first output side shaft 34 through the differential assembly 108.

The differential assembly 108 shown in FIG. 2 includes at least a first side shaft gear 114 and a second side shaft gear 116 meshingly engaged with a pinion gear 118. Each of the first and second side shaft gears 114, 116 are fixedly coupled to the first and second output side shafts 34, 34', respectively. The first and second side shaft gears 114, 116 and the pinion gear 118 are typically bevel gears. Each of the first and second output side shafts 34, 34' are supported by a first output bearing 122 and a second output bearing 126, respectively. It is understood that the number, shape, size, and type of gears 42, 74, 78, 106, bearings 50, 58, 86, 94, 122, 126, shafts 26, 30, 34, 34', and other components within the parallel axis gearbox 10, as well as the components 114, 116, 118 of the differential assembly 108, can vary without altering the scope of the invention. Further, it is understood that the parallel axis gearbox 10 can include more or less components without varying the scope of the invention.

In the embodiment shown in FIG. 2, both the cover 18 and the housing 22 are formed of cast aluminum. However, it is understood that the cover 18 and the housing 22 can be formed from other materials and using alternate forming methods without altering the scope of the invention. Preferably, each the cover 18 and the housing 22 are formed out of metal. Further, it is understood that the size and shape of the cover 18 and the housing 22 can vary without altering the scope of the invention. Likewise, it is understood that the cover 18 can vary in size and shape, including comprising one or more separate covers fixedly coupled to different portions of the housing 22.

As shown in FIGS. 1 and 2, the cover 18 is fixedly coupled to the housing 22 by a plurality of mechanical fasteners 130 spaced around an outer perimeter 134 of the cover 18. Referring to FIG. 2, each of the plurality of mechanical fasteners 130 includes a bolt shaft 138 projecting from a bolt head 142. Each bolt shaft 138 is sized and shaped to pass into a respective passageway 146 in the cover 18. The bolt shaft 138 of each mechanical fastener 130 extends through the respective passageway 146 in the cover 18 and into a respective cavity 150 in the housing 22. Typically, each bolt head 142 is sized and shaped such that each bolt head 142 is larger than an inner diameter 146A of the respective passageway 146 in the cover 18. Further, each bolt shaft 138 includes a threaded portion 154 configured to engage with the respective, correspondingly threaded, cavity 150 in the housing 22.

Figure 3:
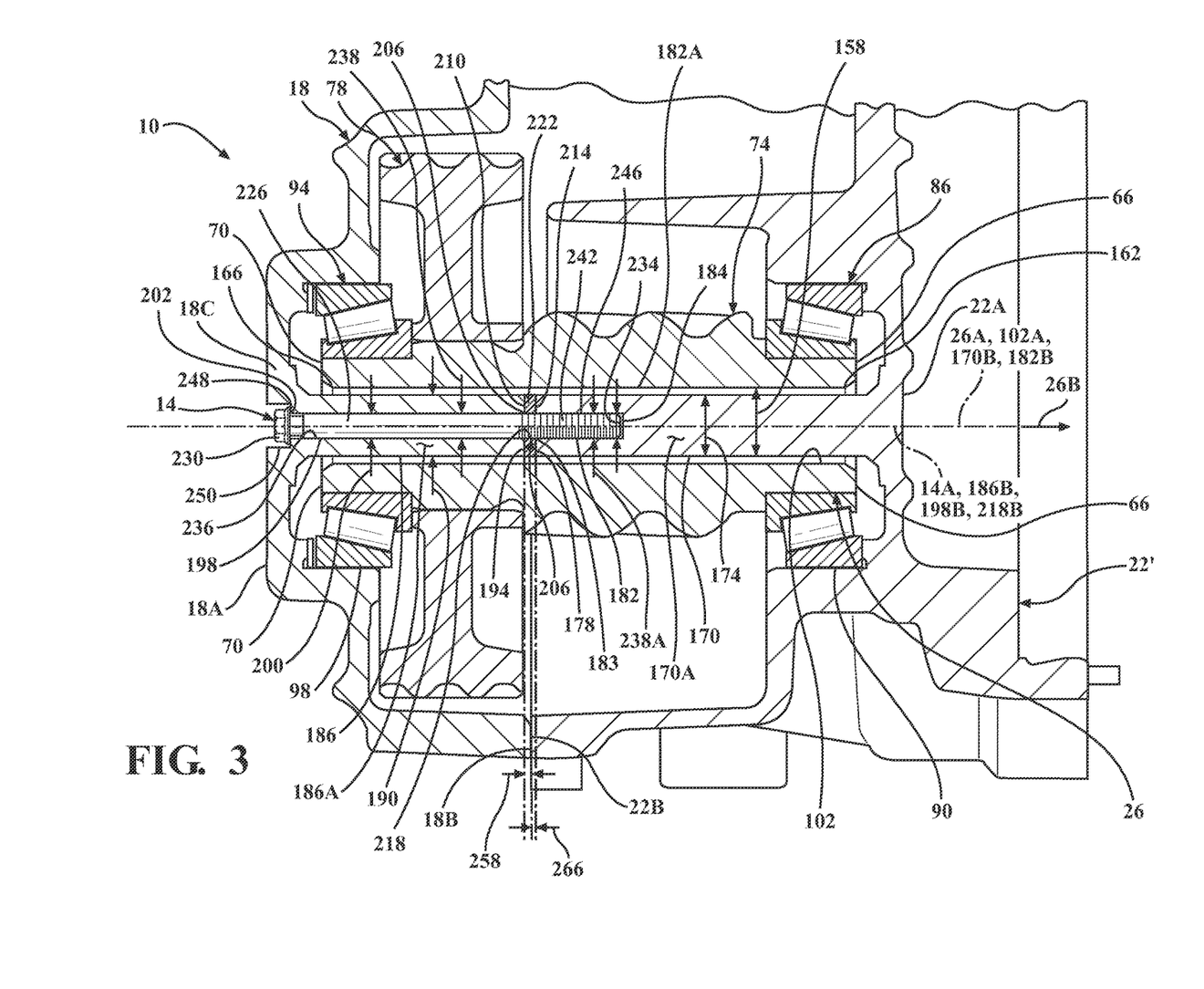
FIG. 3 is an enlarged cross-sectional view of the first embodiment of the parallel axis gearbox of FIG. 1 taken along section line B-B, illustrating the bolt fixedly coupling the cover to the housing though the longitudinal bore in the intermediate shaft.

FIG. 3 shows a cross-sectional view of the parallel axis gearbox 10 taken along section line B-B in FIG. 1, illustration additional details of the bolt 14 fastening the cover 18 to the housing 22 and passing through the longitudinal bore 102 in the intermediate shaft 26. Referring to FIG. 3, the longitudinal bore 102 passing through the intermediate shaft 26 has a first inner diameter 158 extending between a first bore opening 162 adjacent the first shaft end 66 and a second bore opening 166 adjacent the second shaft end 70 of the intermediate shaft 26. In addition, a longitudinal axis 102A of the longitudinal bore 102 is aligned with the axis of rotation 26A of the intermediate shaft 26.

A housing boss 170 having a general cylindrically-shaped main portion 170A extends from the housing 22, as shown in FIG. 3. The housing boss 170 is sized and shaped such that a longitudinal axis 170B of the housing boss 170 is generally aligned with the axis of rotation 26A of the intermediate shaft 26 when the housing 22 is assembled with the intermediate shaft 26. In the embodiment shown in FIG. 3, the housing boss 170 is integrally formed with the housing 22 with both the housing 22 and the housing boss 170 being formed of cast aluminum. It is understood that the housing 22 and the housing boss 170 can be formed of different types of metals and manufactured using alternate manufacturing methods without varying the scope of the invention. Further, the housing boss 170 has an outer diameter 174 that is less than the inner diameter 158 of the longitudinal bore 102 passing through the intermediate shaft 26. The housing boss 170 is sized and shaped to pass into the longitudinal bore 102 in the intermediate shaft 26 when the housing 22 is assembled with the intermediate shaft 26. In addition, the housing boss 170 includes a housing boss end surface 178 that is generally perpendicular to the longitudinal axis 170B of the housing boss 170.

A housing boss cavity 182 extends axially from an opening 183 in the housing boss 170 end surface 178 and terminates at a base surface 184 of the housing boss cavity 182, as shown in FIG. 3. Further, the housing boss cavity 182 has a minimum inner diameter 182A extending between the opening 183 and the base surface 184 of the housing boss cavity 182. In addition, the housing boss cavity 182 has a longitudinal axis 182B that is aligned with the longitudinal axis 170B of the housing boss 170.

A cover boss 186 having a general cylindrically-shaped main portion 186A extends from the cover 18, as shown in FIG. 3. The cover boss 186 is sized and shaped such that a longitudinal axis 186B of the cover boss 186 is generally aligned with the axis of rotation 26A of the intermediate shaft 26 when the cover 18 is assembled with the intermediate shaft 26. In the embodiment shown in FIG. 3, the cover boss 186 is integrally formed with the cover 18 with both the cover 18 and the cover boss 186 being formed of cast aluminum. It is understood that the cover 18 and the cover boss 186 can be formed of different types of metals and manufactured using alternate manufacturing methods without varying the scope of the invention. Further, the cover boss 186 has an outer diameter 190 that is less than the inner diameter 158 of the longitudinal bore 102 passing through the intermediate shaft 26. The cover boss 186 is sized and shaped to pass into the longitudinal bore 102 in the intermediate shaft 26 when the cover 18 is assembled with the intermediate shaft 26.

In addition, the cover boss 186 includes a cover boss end surface 194 that is generally perpendicular to the longitudinal axis 186B of the cover boss 186, as shown in FIG. 3. A cover boss bore 198 extends axially through the cover boss 186. A longitudinal axis 198B of the cover boss bore 198 is generally aligned with the longitudinal axis 186B of the cover boss 186. Further, the cover boss bore 198 has an inner diameter 200 extending between a first opening 202 on an exterior surface 18A of the cover 18 and a second opening 204 on the cover boss end surface 194.

Referring to FIG. 3, the cover boss 186 and the housing boss 170 are sized such that the cover boss 186 end surface 194 is generally parallel with the housing boss end surface 178 with the longitudinal axis 170B of the housing boss 170 generally aligned with the longitudinal axis 186B of the cover boss 186 when the cover 18 and the housing 22 are assembled as part of the parallel axis gearbox 10. Further, after assembly, the cover boss bore 198 is generally aligned with the housing boss cavity 182. In addition, the cover boss end surface 194 optionally frictionally engages with the housing boss end surface 178.

Alternatively, as shown in FIG. 3, the cover boss 186 and the housing boss 170 are sized and shaped such that the cover boss end surface 194 is spaced apart from the housing boss end surface 178 after the parallel axis gearbox 10 is assembled. In certain embodiments, a shim 206 is optionally placed between the cover boss end surface 194 and the housing boss end surface 178. The shim 206 is generally disc-shaped having opposing upper and lower surfaces 210, 214, a passageway 218 extending between the opposing upper and lower surfaces 210, 214, and an outer edge surface 222 extending between the opposing upper and lower surfaces 210, 214 defining a thickness of the shim 206. The shim 206 is formed of a metal, a plastic, a rubber, and/or a combination thereof. Alternative embodiments of the shim 206 include a washer, a select fit shim, a spring washer, a select fit washer, a sleeve, a compressible seal, and the like, as well as combinations of one or more shims 206. When the shim 206 is assembled with the cover boss 186 and the housing boss 170 as part of the parallel axis gearbox 10, the passageway 218 has a longitudinal axis 218B that is generally aligned with the longitudinal axes 182B, 198B of the housing boss cavity 182 and the cover boss bore 198. During assembly, fastening the bolt 14 connecting the cover 18 and the housing 22 compresses the shim 206. Thus, in certain embodiments, the shim 206 is oversized to account for compression of the shim 206 during assembly when full bolt torque is applied to the bolt 14. A combination of one or more shims 206 can be used to obtain the desired preload on the intermediate shaft 26 during the assembly process.

Also shown in FIG. 3, the bolt 14 has a bolt shaft 226 extending from a bolt head 230 and defining a longitudinal axis 14A of the bolt 14. The bolt shaft 226 is generally cylindrical-shaped and terminates at a bolt end surface 234. In addition, the bolt shaft 226 and the passageway 218 through the shim 206 are sized and shaped such that the bolt shaft 226 can be inserted through the passageway 218 of the shim 206. Further, an outer surface 236 of the bolt shaft 226 has a maximum outer diameter 238 generally less than or equal to the inner diameter 200 of the cover boss bore 198. In the embodiment shown in FIG. 3, the bolt shaft 226 includes a threaded portion 242 configured to matingly engage with a threaded portion 246 of the housing boss cavity 182. A maximum outer diameter 238A of the threaded portion 242 of the bolt shaft 226 is equal to or greater than the minimum inner diameter 182A of the threaded portion 246 of the housing boss cavity 182. Optionally, the threaded portion 242 of the bolt shaft 226 is configured to cut mating threads in the housing boss cavity 182 during assembly.

Referring to FIG. 3, the bolt head 230 of the bolt 14 is sized and shaped such that the bolt head 230 frictionally engages the exterior surface 18A of the cover 18. Further, the bolt head 230 has an outer perimeter 248 that is sized and shaped such that the bolt head 230 will not pass entirely through the cover boss bore 198. In certain embodiments, the cover boss bore 198 includes an inlet cavity 250 adjacent the opening 202 in the cover 18 sized and shaped such that the bolt head 230 is at least partially recessed within the inlet cavity 250 when the bolt 14 is assembled as part of the parallel axis gearbox 10. Optionally, one or more of a shim, a washer, and/or a compressible seal can be included between the bolt head 230 and the cover 18 during assembly.

As illustrated in FIG. 3, when the bolt 14, the cover 18, the intermediate shaft 26, and the housing 22 are assembled as part of the parallel axis gearbox 10, the bolt 14 mechanically fastens the cover 18 to the housing 22 through the longitudinal bore 102 of the intermediate shaft 26. In addition, the longitudinal axes 14A, 26A, 102A, 170B, 182B, 186B, 198B of the bolt 14, the intermediate shaft 26, the longitudinal bore 102 through the intermediate shaft 26, the housing boss 170, the housing boss cavity 182, the cover boss 186, and the cover boss bore 198 are generally aligned after assembly as part of the parallel axis gearbox 10.

Referring to FIGS. 1 through 3, the bolt 14 passing through the longitudinal bore 102 of the intermediate shaft 26 fixedly couples the cover 18 to the housing 22. The stiffness of a cover portion 18C near the intermediate shaft 26 in an axial direction 26B of the intermediate shaft 26 (illustrated by arrow 26B shown in FIG. 2) is increased by adding a point of connection between the cover 18 and the housing 22 through the intermediate shaft 26. The increased stiffness of the cover portion 18C near the intermediate shaft 26 reduces potential deflections of the cover 18 under load. Further, the potential for mesh misalignment between the intermediate driven gear 78 and the driving gear 42 of the input shaft 30 is reduced by the increased stiffness of the cover portion 18C. In addition, the potential for mesh misalignment between the intermediate driving gear 74 and the annular driven gear 106 is also reduced by the increase in stiffness of the cover portion 18C. Additionally, the potential for misalignment of the lower and upper intermediate bearings 86, 94 is reduced in comparison to a known parallel axis gearbox 10P lacking a bolt 14 through the intermediate shaft 26, such as shown in FIGS. 4 and 5.

Figure 4:
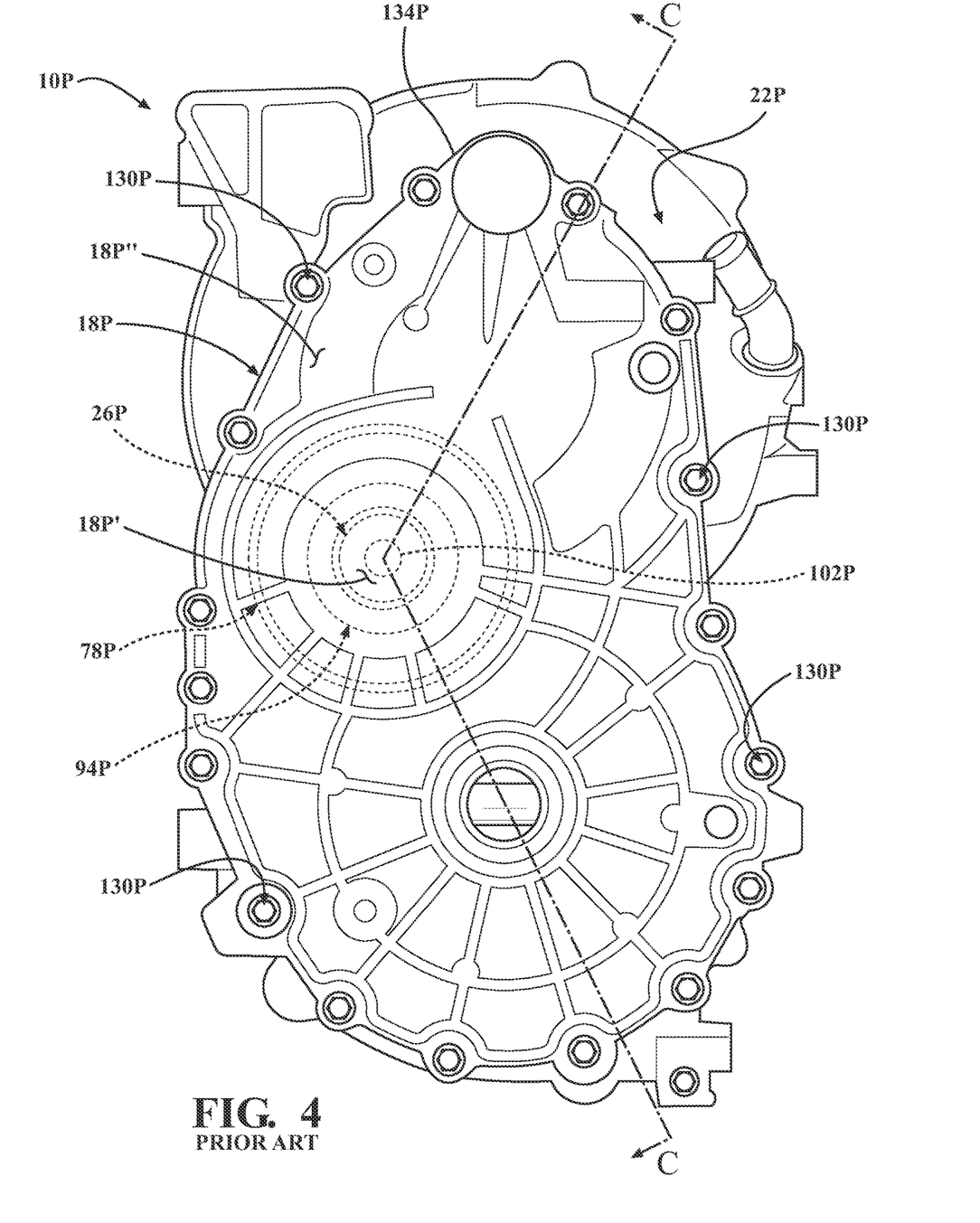
FIG. 4 is a partially transparent view of a known parallel axis gearbox having an intermediate shaft supported and contained within a cover and a housing, illustrating mechanical fasteners spaced around an outer perimeter of the cover attaching the cover to the housing.

Referring to FIG. 4, the known parallel axis gearbox 10P includes a cover 18P fixedly coupled to a housing 22P by a plurality of mechanical fasteners 130P spaced around an outer perimeter 134P of the cover 18P. An aligned cross-sectional view of the known parallel axis gearbox 10P of FIG. 4 taken along section line C-C is shown in FIG. 5. Referring to FIG. 5, the known parallel axis gearbox 10P includes an input shaft 30P, an intermediate shaft 26P, and first and second output side shafts 34P, 34P'. Each of the intermediate shaft 26P, the input shaft 30P, and the first and second output side shafts 34P, 34P' have axes of rotations 26AP, 30AP, 34AP that are parallel to one another. The input shaft 30P has a first shaft end 38P configured to operately couple with a motor output shaft of an electric drive motor. In addition, the input shaft 30P includes an integrally formed driving gear 42P spaced apart from a second shaft end 46P.

Figure 5:
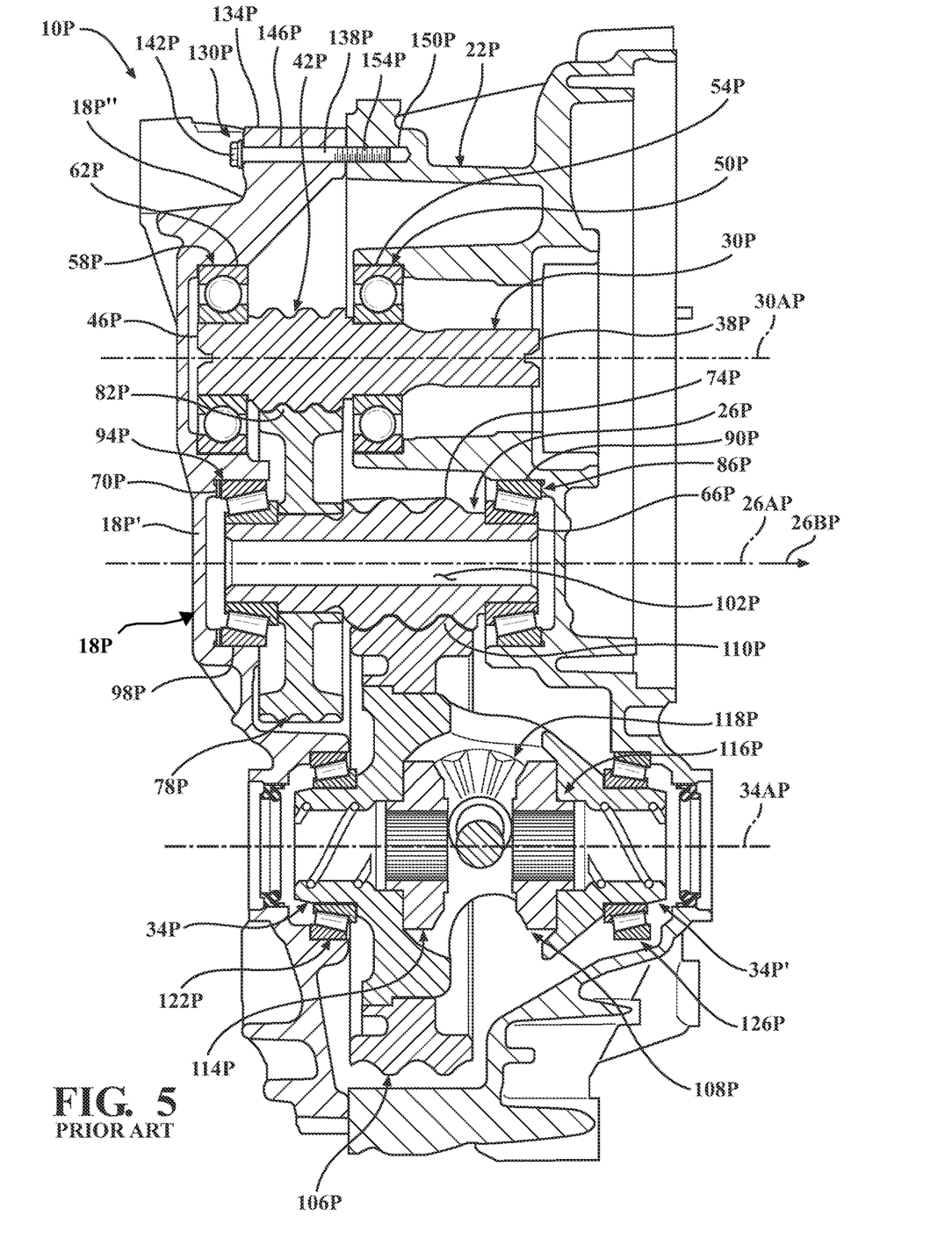
FIG. 5 is an aligned cross-sectional view of the known parallel axis gearbox of FIG. 4 taken along section line C-C, illustrating the mechanical fasteners being spaced apart from the intermediate shaft.

The first shaft end 38P of the input shaft 30P, of the known parallel axis gearbox 10P shown in FIG. 5, is supported and retained by a lower bearing 50P located within a lower bearing cavity 54P in the housing 22P. Similarly, the second shaft end 36P of the input shaft 30P is supported and retained by an upper bearing 58P located within an upper bearing cavity 62P formed in the cover 18P of the known parallel axis gearbox 10P.

The intermediate shaft 26P, of the known parallel axis gearbox shown in FIG. 5, includes a first shaft end 66P, a second shaft end 70P, an integrally formed intermediate driving gear 74P adjacent the first shaft end 66P, and an intermediate driven gear 78P fixedly coupled to the intermediate shaft 26P adjacent the second shaft end 70P. The intermediate driven gear 78P includes gear teeth 82P that are configured to meshingly engage with the driving gear 42P of the input shaft 30P. Further, the intermediate driven gear 78P revolves around the intermediate shaft 26P axis of rotation 26AP. The first shaft end 66P of the intermediate shaft 26P is supported and retained by a lower intermediate bearing 86P located in a lower bearing cavity 90P formed in the cover 18P. Similarly, the second shaft end 70P of the intermediate shaft 26P is supported and retained by an upper intermediate bearing 94P located in an upper bearing cavity 98P formed in the cover 18.

Also shown in FIG. 5, the intermediate shaft 26P of the known parallel axis gearbox 10P includes a longitudinal bore 102P extending between the first shaft end 66P and the second shaft end 70P and aligned with the axis of rotation 26AP of the intermediate shaft 26P. The intermediate shaft 26P having a longitudinal bore 102P, such as shown in FIG. 5, is alternately described as a hollow intermediate shaft 26P.

The known parallel axis gearbox 10P shown in FIG. 5 includes an annular driven gear 106P operatively coupled between the intermediate driving gear 74P and a differential assembly 108P. The annular driven gear 106P revolves around the axis of rotation 34AP of the first and second output side shafts 34P, 34P'. Further, the annular driven gear 106P includes gear teeth 10P configured to matingly engage with the intermediate driving gear 74P. The differential assembly 108P includes at least a first side shaft gear 114P and a second side shaft gear 116P meshingly engaged with a pinion gear 118P. Each of the first and second side shaft gears 114P, 116P are fixedly coupled to the first and second output side shafts 34P, 34P', respectively. Each of the first and second output side shafts 34P, 34P' are supported by a first output bearing 122P and a second output bearing 126P, respectively.

As shown in FIG. 5, each of the plurality of mechanical fasteners 130P of the known parallel axis gearbox 10P includes a bolt shaft 138P projecting from a bolt head 142P. The bolt shaft 138P of each mechanical fastener 130P extends through a passageway 146P in the cover 18P and into a cavity 150P in the housing 22P. Typically, the bolt head 142P is sized and shaped such that the bolt head 142P is larger than the passageway 146P in the cover 18P. Further, the bolt shaft 138P includes a threaded portion 154P configured to mechanically engage with the cavity 150P in the housing 22P.

Referring to FIGS. 4 and 5, the cover 18P of the known parallel axis gearbox 10P is fastened to the housing 22P solely around the outer perimeter 134P of the cover 18P. In contrast, the embodiment of the parallel axis gearbox 10 shown in FIGS. 1 through 3 includes the bolt 14 fixedly coupling the cover 18 to the housing through the intermediate shaft 26. The only support between the cover 18P and the housing 22P of the known parallel axis gearbox 10P is along the outer perimeter 134P of the cover 18P, resulting in a cover portion 18P' near the intermediate shaft 26P being less stiff in an axial direction 26BP of the intermediate shaft 26P (illustrated by arrow 26BP in FIG. 5) than portions 18P''' of the cover 18P near the mechanical fasteners 130P. Thus, the cover portion 18P' of the cover 18P has an increased tendency to deflect under load. Deflections under load of the cover portion 18P' near the intermediate shaft 26 can increase potential mesh misalignments between the intermediate driven gear 78P and the driving gear 42P of the input shaft 30P, as well as between the intermediate driving gear 74P and the annular driven gear 106P. In addition, deflections of the cover 18P under load can result in increased bearing misalignment between the upper intermediate bearing 94P and the lower intermediate bearing 86P.

In contrast to the known parallel axis gearbox 10P, the embodiment of the parallel axis gearbox 10 shown in FIGS. 1 through 3 includes a point of connection between the cover 18 and the housing 22. Adding the bolt 14 passing through the longitudinal bore 102 of the intermediate shaft 26, as shown in FIG. 3, increases the stiffness of the cover portion 18C near the intermediate shaft 26 in an axial direction 26B of the intermediate shaft 26. The increased stiffness in the axial direction 26B due to the inclusion of the point of connection between the cover 18 and the housing 22 through the intermediate shaft 26 improves gear durability and bearing durability by reducing gear mesh misalignments as well as reducing bearing misalignments. Further, the increased stiffness in the cover 18 near the intermediate shaft 26 reduces sensitivity of preload to thermal expansion since deflections of the cover 18 under load are reduced.

In the embodiment shown FIG. 3, the cover 18 incudes a mounting surface 18B configured to matingly engage with a mounting surface 22B on the housing 22. The end surface 194 of the cover boss 186 is spaced apart in the axial direction 26B from the mounting surface 18B of the cover 18 by a first predetermined distance 258. Likewise, the end surface 178 of the housing boss 170 is spaced apart in the axial direction 26B from the mounting surface 22B of the housing 22 by a second predetermined distance 266. The sum of the first and second predetermined distances 258, 266 is selected to accommodate the shim 206 positioned between the end surfaces 194, 178 of the cover boss 186 and the housing boss 170. In certain embodiments, the sum of the first and second predetermined distances 258, 266 is less than the uncompressed thickness of the shim 206 if the shim 206 will be compressed during assembly. In the embodiment shown in FIG. 3, the axial distance between the upper and lower surfaces 210, 214 of the shim 206 is less than the axial distance between the end surface 194 of the cover boss 186 and the opening 202 to the cover boss bore 198 adjacent the exterior surface 18A of the cover 18. Further, the axial distance between the upper and lower surfaces 210, 214 of the shim 206 is less than the axial distance between the end surface 178 of the housing boss 170 and an exterior surface 22A of the housing 22 adjacent the intermediate shaft 26. It is understood that the relative axial distances between the upper and lower surfaces 210, 214 of the shim 206, between the end surface 194 of the cover boss 186 and the opening 202 to the cover boss bore 198, and between the end surface 178 of the housing boss 170 and the exterior surface 22A of the housing 22 can vary without altering the scope of the invention.

Figure 6:
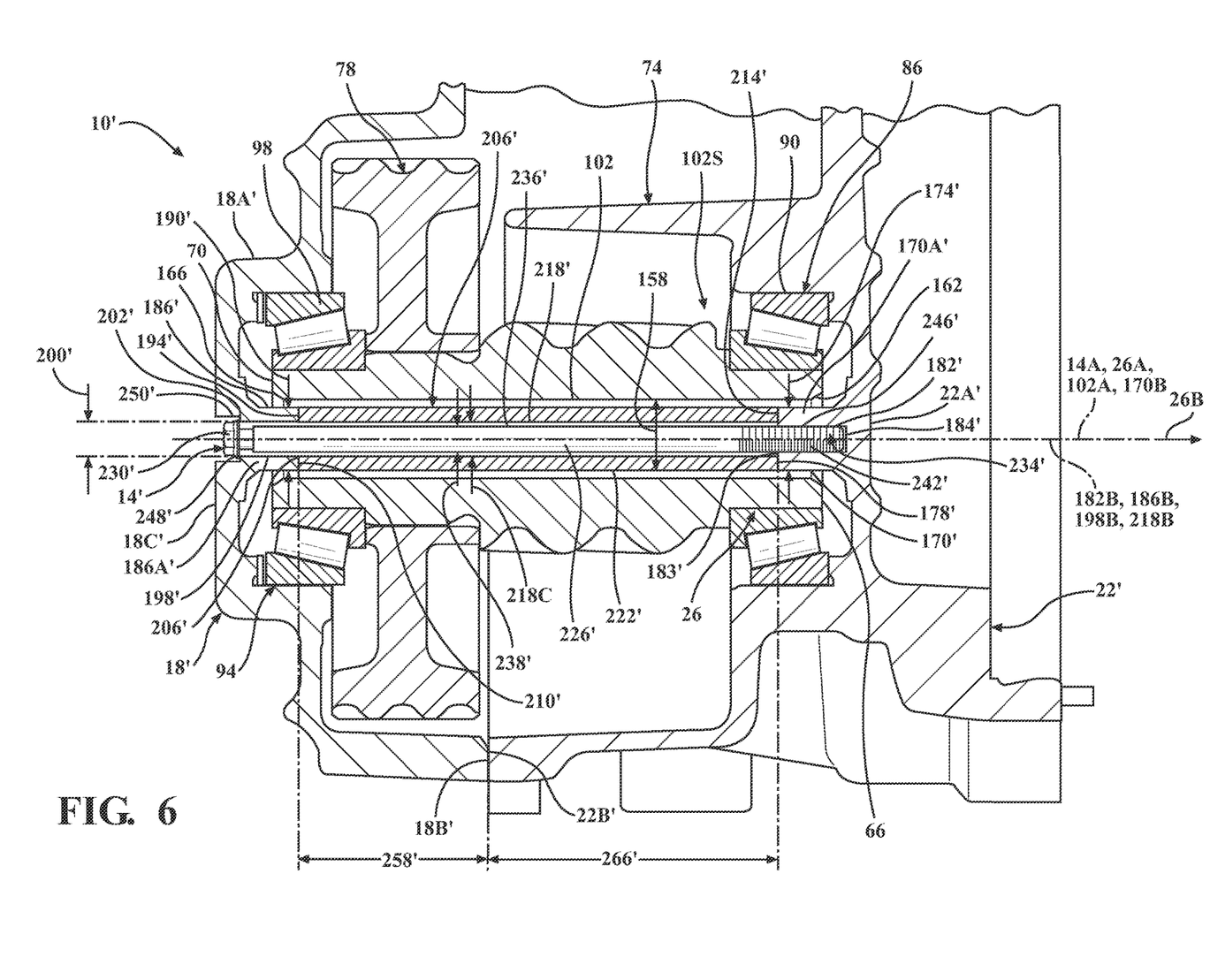
FIG. 6 is an enlarged cross-sectional view of the parallel axis gearbox of FIG. 1 taken along section line B-B, illustrating a second embodiment of the present invention.

FIG. 6 illustrates a second embodiment of a parallel axis gearbox 10' having a cover 18' with a modified cover boss 186', having housing 22' with a modified housing boss 170', and having a spacer 206' positioned between the modified cover boss 186' and the modified housing boss 170'. As with the first embodiment, the second embodiment includes an intermediate shaft 26 having a longitudinal bore 102 extending between a first intermediate shaft end 66 and a second intermediate shaft end 70 aligned with the axis of rotation 26A of the intermediate shaft 26. In addition, the longitudinal bore 102 has a first inner diameter 158 extending between a first bore opening 162 adjacent the first shaft end 66 and a second bore opening 166 adjacent the second shaft end 70 of the intermediate shaft 26.

Also shown in FIG. 6, each of the first and second intermediate shaft ends 66, 70 are supported and retained by respective lower and upper bearings 86, 94. The lower bearing 86 is retained within a cavity 90 in the housing 22'. Further, the upper bearing 94 is retained within a cavity 98 in the cover 18'. In addition, an intermediate driven gear 78 is fixedly coupled to the intermediate shaft 26. An intermediate driving gear 74 is integrally formed with the intermediate shaft 26.

The modified housing boss 170' having a general cylindrical-shaped main portion 170A' extends from the housing 22', as shown in FIG. 6. The modified housing boss 170' is sized and shaped such that a longitudinal axis 170B of the modified housing boss 170' is aligned with the axis of rotation 26A of the intermediate shaft 26 when the housing 22' is assembled with the intermediate shaft 26. In the second embodiment shown in FIG. 6, the modified housing boss 170' is integrally formed with the housing 22' with both the housing 22' and the modified housing boss 170' being formed of cast aluminum. It is understood that the housing 22' and the modified housing boss 170' can be formed of different types of metals and manufactured using alternate manufacturing methods without varying the scope of the invention. Further, the modified housing boss 170' has an outer diameter 174' that is less than an inner diameter 158 of the longitudinal bore 102 passing through the intermediate shaft 26. The modified housing boss 170' is sized and shaped to such that the modified housing boss 170' can pass into the longitudinal bore 102 in the intermediate shaft 26 when the housing 22' is assembled with the intermediate shaft 26. In addition, the modified housing boss 170' includes a housing boss end surface 178' that is generally perpendicular to the longitudinal axis 170B of the modified housing boss 170'.

The second embodiment includes a housing boss cavity 182' extending axially from an opening 183' in the housing boss end surface 178' and terminates at a base surface 184' of the housing boss cavity 182', as shown in FIG. 6. Further, the housing boss cavity 182' is sized and shaped to matingly engage with a threaded portion 242' of a bolt 14' passing through the intermediate shaft 26. In addition, the housing boss cavity 182' has a longitudinal axis 182B that is generally aligned with the longitudinal axis 170B of the modified housing boss 170'.

The modified cover boss 186', of the second embodiment shown in FIG. 6, has a general cylindrical-shaped main portion 186A' extending from the cover 18'. The modified cover boss 186' is sized and shaped such that a longitudinal axis 186B of the modified cover boss 186' is generally aligned with the axis of rotation 26A of the intermediate shaft 26 when the cover 18' is assembled with the intermediate shaft 26. In the embodiment shown in FIG. 6, the modified cover boss 186' is integrally formed with the cover 18' with both the cover 18' and the modified cover boss 186' being formed of cast aluminum. It is understood that the cover 18' and the modified cover boss 186' can be formed of different types of metals and manufactured using alternate manufacturing methods without varying the scope of the invention. Further, the modified cover boss 186' has an outer diameter 190' that is less than the inner diameter 158 of the longitudinal bore 102 passing through the intermediate shaft 26. The modified cover boss 186' is sized and shaped to such that the modified cover boss 186' can pass into the longitudinal bore 102 in the intermediate shaft 26 when the cover 18' is assembled with the intermediate shaft 26.

In addition, the modified cover boss 186' includes a cover boss end surface 194' that is generally perpendicular to the longitudinal axis 186B of the modified cover boss 186', as shown in FIG. 6. A cover boss bore 198' extends axially through the modified cover boss 186' between a first opening 202' on an exterior surface 18A' of the cover 18' and a second opening 204' on the cover boss end surface 194A'. The longitudinal axis 198B of the cover boss bore 198' is generally aligned with the longitudinal axis 186B of the modified cover boss 186'.

Referring to FIG. 6, the modified cover boss 186' and the modified housing boss 170' are sized such that the cover boss end surface 194' is generally parallel with and spaced apart from the housing boss end surface 178' with the longitudinal axis 170B of the modified housing boss 170' aligned with the longitudinal axis 186B of the modified cover boss 186' when the cover 18' and the housing 22' are assembled as part of the parallel axis gearbox 10'. Further, after assembly, the cover boss bore 198' is generally aligned with the housing boss cavity 182'.

The spacer 206' is assembled between the modified cover boss end surface 194' and the modified housing boss end surface 178', as shown in FIG. 6. In the embodiment shown in FIG. 6, the spacer 206' is generally a cylindrically-shaped sleeve having opposing upper and lower surfaces 210', 214', a passageway 218' extending longitudinally between the opposing upper and lower surfaces 210', 214', and an outer edge surface 222' extending between the opposing upper and lower surfaces 210', 214' defining a length of the spacer 206'. The spacer 206' is preferably formed of a metal such as steel, aluminum, and the like as non-limiting examples. Optionally, one or more shims 206, such as shown in FIG. 3, can be assembled with the spacer 206'. When the spacer 206' is assembled with the modified cover boss 186' and the modified housing boss 170' as part of the parallel axis gearbox 10', the passageway 218' of the spacer 206' has a longitudinal axis 218B that is generally aligned with the longitudinal axes 182B, 198B of the housing boss cavity 182' and the cover boss bore 198'. During assembly, fastening the bolt 14' connecting the cover 18' and the housing 22' compresses the spacer 206'. Thus, in certain embodiments, the spacer 206' is oversized to account for compression of the spacer 206' during assembly when full bolt torque is applied to the bolt 14'. A combination of one or more shims 206 in addition to the spacer 206' can be used to obtain the desired preload on the intermediate shaft 26 during the assembly process.

Also shown in FIG. 6, the bolt 14' has a bolt shaft 226' extending from a bolt head 230' and defining a longitudinal axis 14A of the bolt 14'. The bolt shaft 226' is generally cylindrical-shaped and terminates at a bolt end surface 234'. Further, an outer surface 236' of the bolt shaft 226' has a maximum outer diameter 238' generally less than or equal to the inner diameter 200' of the cover boss bore 198'. In addition, the spacer 206' has a minimum inner diameter 218C that is generally larger than the maximum outer diameter 238' of the bolt shaft 226'. Furthermore, the threaded portion 242' of the bolt shaft 226' is configured to matingly engage with a threaded portion 246' of the housing boss cavity 182'. Optionally, the threaded portion 242' of the bolt shaft 226' is configured to cut mating threads in the housing boss cavity 182' during assembly.

In the second embodiment shown in FIG. 6, the bolt head 230' of the bolt 14' is sized and shaped such that the bolt head 230' frictionally engages the exterior surface 18A' of the cover 18'. Further, the bolt head 230' has an outer perimeter 248' that is sized and shaped such that the bolt head 230' will not pass entirely through the cover boss bore 198'. In certain embodiments, the cover boss bore 198' includes an inlet cavity 250' adjacent the opening 202' in the cover 18' sized and shaped such that the bolt head 230' is at least partially recessed within the inlet cavity 250' when the bolt 14' is assembled as part of the parallel axis gearbox 10'. Optionally, one or more of a shim, a washer, and/or a compressible seal can be included between the bolt head 230' and the cover 18' during assembly.

As illustrated in FIG. 6, when the bolt 14', the cover 18', the intermediate shaft 26, the spacer 206', and the housing 22' are assembled as part of the parallel axis gearbox 10', the bolt 14' mechanically fastens the cover 18' to the housing 22' through the longitudinal bore 102 of the intermediate shaft 26. In addition, the longitudinal axes 14A, 26A, 102A, 170B, 182B, 186B, 198B of the bolt 14', the intermediate shaft 26', the longitudinal bore 102 through the intermediate shaft 26, the housing boss 170', the housing boss cavity 182', the cover boss 186', the cover boss bore 198', and the spacer 206' are generally aligned after assembly as part of the parallel axis gearbox 10'.

In the second embodiment shown FIG. 6, the cover 18' has a mounting surface 18B' configured to matingly engage with a mounting surface 22B' of the housing 22'. The intermediate shaft 26 defines an axial direction 26B of the parallel axis gearbox 10', as illustrated by arrow 26B in FIG. 6. The end surface 194' of the modified cover boss 186' is spaced apart in the axial direction 26B from the mounting surface 18B' of the cover 18' by a first predetermined distance 258'. Likewise, the end surface 178' of the housing boss 170' is spaced apart in the axial direction 26B from the mounting surface 22B' of the housing 22' by a second predetermined distance 266'. The sum of the first and second predetermined distances 258', 266' is selected to accommodate the spacer 206' positioned between the end surfaces 194', 178' of the modified cover boss 186' and the modified housing boss 170'. In certain embodiments, the sum of the first and second predetermined distances 258', 266' is less than the uncompressed distance between the upper and lower surfaces 210', 214' of the spacer 206' if the spacer 206' is compressed during assembly. In other embodiments, the overall length of the spacer 206' is selected based in part on the sum of the first and second predetermined distances 258', 266'. In addition, one or more of a supplemental shim, a washer, a compressible shim, a spring washer, and the like, as non-limiting examples, can be selectively assembled with the spacer 206' to compensate for component dimensional variation.

The axial distance between the upper and lower surfaces 210', 214' of the spacer 206' shown in FIG. 6 is greater than the axial distance between the end surface 194' of the modified cover boss 186' and the opening 202' of the cover boss bore 198' adjacent the exterior surface 18A' of the cover 18'. Further, the axial distance between the upper and lower surfaces 210', 214' of the spacer 206' is greater than the axial distance between the end surface 178' of the housing boss 170' and the exterior surface 22A' of the housing 22'. It is understood that the relative axial distances between the upper and lower surfaces 210', 214' of the spacer 206', between the end surface 194' of the modified cover boss 186' and the opening 202' to the cover boss bore 198', and between the end surface 178' of the modified housing boss 170' and the exterior surface 22A' of the housing 22' can vary without altering the scope of the invention. Further, it is understood that the relative sizes, shapes, and overall lengths of the modified cover boss 186', the modified housing boss 170', and the spacer 206' can vary without altering the scope of the invention.

Referring to FIG. 6, the bolt 14' passing through the longitudinal bore 102 of the intermediate shaft 26 fixedly couples the cover 18' to the housing 22'. The stiffness of a cover portion 18C' near the intermediate shaft 26 in the axial direction 26B, illustrated by arrow 26B shown in FIG. 6, is increased by adding a point of connection between the cover 18' and the housing 22' through the intermediate shaft 26. The increased stiffness of the cover portion 18C' near the intermediate shaft 26 reduces potential deflections of the cover 18' under load. Further, the potential for mesh misalignment between the intermediate driven gear 78 and the driving gear 42 is reduced by the increased stiffness of the cover portion 18C'. In addition, the potential for mesh misalignment between the intermediate driving gear 74 and the annular driven gear 106 is also reduced by the increase of stiffness of the cover portion 18C'. Additionally, the potential for misalignment of the lower and upper intermediate bearings 86, 94 is reduced in compared to the known parallel axis gearbox 10P lacking a bolt 14' through the intermediate shaft 26.

Figure 7:
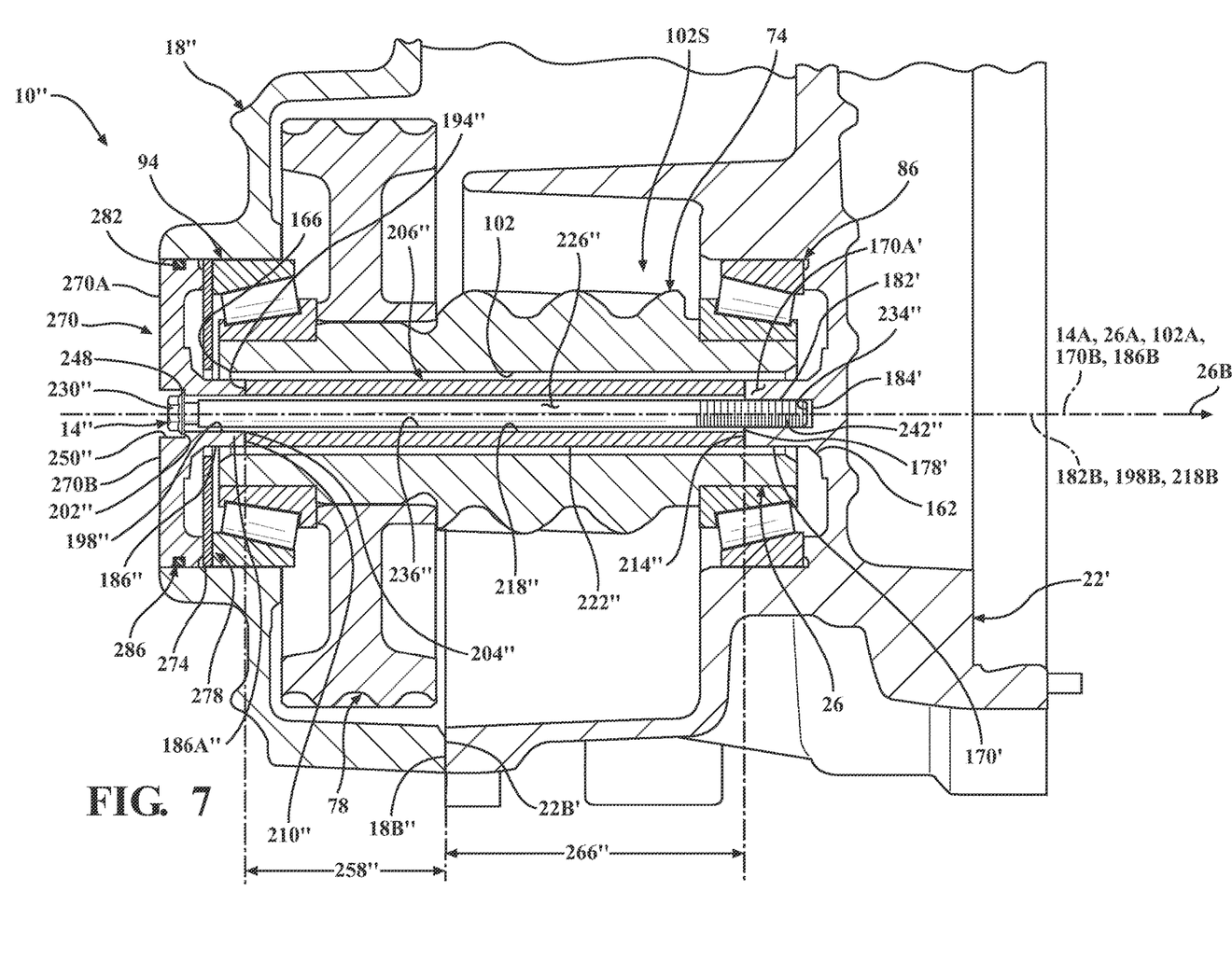
FIG. 7 is an enlarged cross-sectional view of the parallel axis gearbox of FIG. 1 taken along section line B-B, illustrating a third embodiment of the present invention.

A third embodiment of a parallel axis gearbox 10" is shown in FIG. 7. Both the second and third embodiments of the parallel axis gearbox 10', 10", shown in FIGS. 6 and 7, respectively, include an intermediate shaft subassembly 102S comprising at least an intermediate shaft 26 with a longitudinal bore 102, lower and upper bearings 86, 94, and the intermediate driven gear 78. Further, both the second and third embodiments of the parallel axis gearbox 10', 10" include a modified housing boss 170' projecting from a housing 22', and a bolt 14" and a spacer 206" inserted into the intermediate shaft 26 longitudinal bore 102. In addition, the third embodiment includes a cover 18" having a cover mounting surface 18B" configured to be fixedly coupled to a housing mounting surface 22B' of the housing 22'.

However, the third embodiment shown in FIG. 7 includes a cap 270 inserted into a passageway 274 in the cover 18" providing access to a cover bearing cup 278 that supports and retains the upper intermediate bearing 94. When assembled, the cap 270 seats against the cover bearing cup 278. The cap 270 is configured to matingly engage with the passageway 274 in the cover 18". A channel 282 extends circumferentially around the cap 270 and is configured to support and retain a compressible seal 286. The compressible seal 286 abuts the passageway 274 in the cover 18" when the cap 270 is inserted into the passageway 274, forming a tight seal between the cap 270 and the cover 18".

In addition, the cap 270 shown in FIG. 7 includes a cap boss 186" having a general cylindrical-shaped main portion 186A" extending from the cap 270. The cap boss 186" is sized and shaped such that a longitudinal axis 186B of the cap boss 186" is aligned with the axis of rotation 26A of the intermediate shaft 26 when the cap 270 and the cover 18" are assembled with the intermediate shaft 26. In the embodiment shown in FIG. 7, the cap boss 186" is integrally formed with the cap 270 and is formed of a metal such as cast aluminum, steel, and the like. It is understood that the cap 270 and cover 18" can be formed of different types of metals and manufactured using alternate manufacturing methods without varying the scope of the invention. The cap boss 186" includes an end surface 194" that is generally perpendicular to the longitudinal axis 186B of the cap boss 186", as shown in FIG. 7. Further, the cap boss 186" is sized and shaped such that the end surface 194" of the cap boss 186" will pass into the second bore opening 166 of the longitudinal bore 102 when the cap 270 and the cover 18" are assembled with the intermediate shaft 26.

Referring to FIG. 7, a cap boss bore 198" extends axially through the cap boss 186" between a first opening 202" on an exterior surface 270A of the cap 270 and a second opening 204" on the cap boss end surface 194". A longitudinal axis 198B of the cap boss bore 198" is generally aligned with the longitudinal axis 186B of the cap boss 186".

As shown in FIG. 7, the cap boss 186" and the modified housing boss 170' are sized and shaped such that the cap boss end surface 194" is generally parallel with and spaced apart from the modified housing boss end surface 178' with the longitudinal axis 170B of the modified housing boss 170' generally aligned with the longitudinal axis 186B of the cap boss 186" when the cap 270, the cover 18", and the housing 22' are assembled as part of the parallel axis gearbox 10". Further, after assembly, the cap boss bore 198" is generally aligned with the housing boss cavity 182'.

The spacer 206" is assembled between the cap boss end surface 194" and the modified housing boss end surface 178', as shown in FIG. 7. In the embodiment shown in FIG. 7, the spacer 206" is generally a cylindrically-shaped sleeve having opposing upper and lower surfaces 210", 214", a passageway 218" extending longitudinally between the opposing upper and lower surfaces 210", 214", and an outer edge surface 222" extending between the opposing upper and lower surfaces 210", 214" defining a length of the spacer 206". The spacer 206" is preferably formed of a metal such as steel, aluminum, and the like as non-limiting examples. Optionally, one or more shims 206, such as shown in FIG. 3, can be assembled with the spacer 206". When the spacer 206" is assembled with the cap boss 186" and the modified housing boss 170' as part of the parallel axis gearbox 10", the passageway 218" of the spacer 206" has a longitudinal axis 218B that is generally aligned with the longitudinal axes 182B, 198B of the housing boss cavity 182' and the cap boss bore 198". During assembly, fastening the bolt 14" between the cap 270 and the housing 22' compresses the spacer 206". Thus, in certain embodiments, the spacer 206" is oversized to account for compression of the spacer 206" during assembly when full bolt torque is applied to the bolt 14". A combination of one or more shims 206 in addition to the spacer 206" can be used to obtain the desired preload on the intermediate shaft 26 during the assembly process.

Also shown in FIG. 7, the bolt 14" has a bolt shaft 226" extending from a bolt head 230" defining a longitudinal axis 14A of the bolt 14". The bolt shaft 226" is generally cylindrical-shaped and terminates at a bolt end surface 234". Further, an outer surface 236" of the bolt shaft 226" is sized and shaped such that the bolt shaft 226" can pass through the cap boss bore 198" and through the spacer 206" passageway 218". Furthermore, the bolt shaft 226" includes a threaded portion 242" configured to matingly engage with a threaded portion 246' of the housing boss cavity 182'. Optionally, the threaded portion 242" of the bolt shaft 226" is configured to cut mating threads in the housing boss cavity 182' during assembly.

In the third embodiment shown in FIG. 7, the bolt head 230" of the bolt 14" is sized and shaped such that the bolt head 230" frictionally engages the exterior surface 270A of the cap 270. Further, the bolt head 230" has an outer perimeter 248" that is sized and shaped such that the bolt head 230" will not pass entirely through the cap boss bore 198". In certain embodiments, the cap boss bore 198" includes an inlet cavity 250" adjacent the opening 202" in the cap 270 sized and shaped such that the bolt head 230" is at least partially recessed within the inlet cavity 250" when the bolt 14" is assembled as part of the parallel axis gearbox 10". Optionally, one or more of a shim, a washer, and/or a compressible seal can be included between the bolt head 230" and the cap 270 during assembly.

As illustrated in FIG. 7, when the bolt 14", the cover 18", the cap 270, the intermediate shaft 26, the spacer 206", and the housing 22' are assembled as part of the parallel axis gearbox 10", the bolt 14" mechanically fastens the cap 270 to the housing 22' through the longitudinal bore 102 of the intermediate shaft 26. In addition, the longitudinal axes 14A, 26A, 102A, 170B, 182B, 186B, 198B of the bolt 14", the intermediate shaft 26, the longitudinal bore 102 through the intermediate shaft 26, the modified housing boss 170', the housing boss cavity 182', the cap boss 186", the cap boss bore 198", and the spacer 206" are generally aligned after assembly as part of the parallel axis gearbox 10".

In the third embodiment shown FIG. 7, the end surface 194" of the cap boss 186" is spaced apart in the axial direction 26B from the mounting surface 18B" of the cover 18" by a first predetermined distance 258" after the cap 270 is assembled with the cover 18". Likewise, the end surface 178' of the housing boss 170' is spaced apart in the axial direction 26B from the mounting surface 22B' of the housing 22' by a second predetermined distance 266'. The sum of the first and second predetermined distances 258", 266" is selected to accommodate the spacer 206" positioned between the end surfaces 194", 178' of the cap boss 186" and the modified housing boss 170'. In certain embodiments, the sum of the first and second predetermined distances 258", 266" is less than the uncompressed distance between the upper and lower surfaces 210", 214" of the spacer 206" if the spacer 206" is compressed during assembly. In other embodiments, the overall length of the spacer 206" is selected based in part on the sum of the first and second predetermined distances 258", 266". In addition, one or more of a supplemental shim, a washer, a compressible shim, a spring washer, and the like, as non-limiting examples, can be selectively assembled with the spacer 206" to compensate for component dimensional variation.

The axial distance between the upper and lower surfaces 210", 214" of the spacer 206" in the third embodiment shown in FIG. 7 is greater than the axial distance between the end surface 194" of the cap boss 186" and the opening 202" to the cap boss bore 198" adjacent the exterior surface 270A' of the cap 270. Further, the axial distance between the upper and lower surfaces 210", 214" of the spacer 206" is greater than the axial distance between the end surface 178' of the housing boss 179' and the exterior surface 22A' of the housing 22'. It is understood that the relative axial distances between the upper and lower surfaces 210", 214" of the spacer 206", between the end surface 194" of the cap boss 186" and the opening 202" to the cap boss bore 198", and between the end surface 178' of the modified housing boss 170' and the exterior surface 22A' of the housing 22' can vary without altering the scope of the invention. Further, it is understood that the relative sizes, shapes, and overall lengths of the cap boss 186", the modified housing boss 170', and the spacer 206" can vary without altering the scope of the invention. In addition, it is understood that the overall lengths of the cap boss 186" and the modified housing boss 170' can be increased and the spacer 206" replaced by a shim 206, such as shown in the first embodiment of FIG. 3.

Referring to FIG. 7, the bolt 14" passing through the longitudinal bore 102 of the intermediate shaft 26 fixedly couples the cap 270 to the housing 22'. The axial stiffness is increased of a cap portion 270B near the intermediate shaft 26 by adding a point of connection between the cap 270 and the housing 22' through the intermediate shaft 26. The increased stiffness of the cap portion 270B near the intermediate shaft 26 reduces potential deflections of the cap 270 under load. Since the cover bearing cup 278 is effectively axially freed from the cover 18", the bolt 14" doesn't offer additional stiffness to the cover 18". However, the bolt 14" does offer additional stiffness to the intermediate shaft subassembly 102S.

One benefit of the bolt 14, 14', 14" though the intermediate shaft 26 of the parallel axis gearbox 10, 10', 10" is an added point of connection between the housing 22, 22' and the cover 18, 18'/cap 270 through the intermediate shaft 26. A second benefit is axial stiffness of the cover 18, 187 cap 270 is increased since the bolt 14, 14', 14" passes through the intermediate shaft 26 and is fixedly coupled to the housing 22, 22'. A third benefit is the bolt 14, 14', 14" passing through the intermediate shaft adds stiffness to the intermediate shaft assembly 102S. A fourth benefit is the increased stiffness of the intermediate shaft assembly 102S and/or increased stiffness in the cover 18, 18' reduces the potential for mesh misalignments within the parallel axis gearbox 10, 10', 10". A fifth benefit is a reduced potential for bearing misalignments since the potential for the cover 18, 18' deflecting under load is reduced by the bolt 14, 14', 14" connecting the cover 18, 18' to the housing 22, 22' through the intermediate shaft 26.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A parallel axis gearbox for a vehicle, comprising:
an input shaft having a first driving gear and having a first axis of rotation;
an intermediate shaft having an intermediate driving gear, an intermediate driven gear, and a longitudinal bore extending through said intermediate shaft, said intermediate driven gear meshingly engaged with said first driving gear of said input shaft and having a second axis of rotation, said second axis of rotation being parallel to said first axis of rotation;
a cover fixedly coupled to a housing, said cover and said housing containing and supporting said input shaft and said intermediate shaft;
a bolt fixedly coupling said cover to said housing, said bolt passing through said longitudinal bore of said intermediate shaft;
a cover boss projects from said cover and terminates at a cover boss end surface, and
a cover boss bore extends longitudinally through said cover boss between a first opening on an exterior surface of said cover and a second opening in said cover boss end surface.

2. The parallel axis gearbox of claim 1, wherein:
a housing boss projects from said housing and terminates at a housing boss end surface; and
a housing boss cavity extends longitudinally from said housing boss end surface between a third opening in said housing boss and terminating at a housing boss cavity end surface.

3. The parallel axis gearbox of claim 2, wherein:
said bolt has a bolt shaft sized and shaped such that at least a portion of said bolt shaft can pass through said cover boss bore; and
said bolt shaft has a threaded portion configured to fixedly couple to said housing boss cavity when said bolt is assembled with said cover, said intermediate shaft, and said housing.

4. The parallel axis gearbox of claim 3, wherein:
a spacer is inserted into said longitudinal bore of said intermediate shaft, said spacer being sized and shaped to fit within said longitudinal bore, said spacer having a passageway extending between opposing first and second ends of said spacer.

5. The parallel axis gearbox of claim 4, wherein:
at least a portion of said bolt shaft passes through said passageway of said spacer when said cover, said housing, said intermediate shaft, said spacer, and said bolt are assembled as part of said parallel axis gearbox.

6. The parallel axis gearbox of claim 5, wherein:
said spacer comprises one or more of a sleeve, a shim, a washer, a seal, and/or combinations thereof.

7. The parallel axis gearbox of claim 6, wherein:
said spacer is compressed between said cover boss and said housing boss during assembly of said cover to said housing.

8. The parallel axis gearbox of claim 7, wherein:
said spacer is formed from one or more of a metal, a plastic, and/or a rubber.

9. The parallel axis gearbox of claim 8, wherein:
said cover and said housing being formed from a metal.

10. The parallel axis gearbox of claim 9, wherein:
an annular driven gear is meshingly engaged with said intermediate driven gear; and
a first output side shaft and a second output side shaft are operatively coupled to said annular driven gear through a differential assembly.

11. A parallel axis gearbox for a vehicle, comprising:
an input shaft having a first driving gear and having a first axis of rotation;
an intermediate shaft having an intermediate driving gear, an intermediate driven gear, and a longitudinal bore extending through said intermediate shaft, said intermediate driven gear meshingly engaged with said first driving gear of said input shaft and having a second axis of rotation, said second axis of rotation being parallel to said first axis of rotation;
a cover fixedly coupled to a housing, said cover and said housing containing and supporting said input shaft and said intermediate shaft;
a cap inserted into a cover passageway in said cover; and
a bolt fixedly coupling said cap to said housing, said bolt passing through said longitudinal bore of said intermediate shaft.

12. The parallel axis gearbox of claim 11, wherein:
a cap boss projects from said cover and terminates at a cap boss end surface, said cap boss sized and shaped such that said cap boss end surface is insertable into said longitudinal bore of said intermediate shaft when said cover and said cap are assembled with said intermediate shaft; and
a cap boss bore extends longitudinally through said cap boss between a first opening on an exterior surface of said cap and a second opening in said cap boss end surface.

13. The parallel axis gearbox of claim 12, wherein:
a housing boss projects from said housing and terminates at a housing boss end surface, said housing boss sized and shaped such that said housing boss end surface is insertable into said longitudinal bore of said intermediate shaft when said housing is assembled with said intermediate shaft; and
a housing boss cavity extends longitudinally from said housing boss end surface between a third opening in said housing boss and terminating at a housing boss cavity end surface.

14. The parallel axis gearbox of claim 13, wherein:
said bolt has a bolt shaft sized and shaped such that at least a portion of said bolt shaft can pass through said cap boss bore; and
said bolt shaft has a threaded portion configured fixedly couple to said housing boss cavity when said bolt is assembled with said cap, said cover, said intermediate shaft, and said housing.

15. The parallel axis gearbox of claim 14, wherein:
a spacer is inserted into said longitudinal bore of said intermediate shaft, said spacer being sized and shaped to fit within said longitudinal bore, said spacer having a passageway extending between opposing first and second ends of said spacer; and at least a portion of said bolt shaft passes through said passageway of said spacer when said cap, said cover, said housing, said intermediate shaft, said spacer, and said bolt are assembled as part of said parallel axis gearbox.

16. The parallel axis gearbox of claim 15, wherein:

said spacer comprises one or more of a sleeve, a shim, a washer, a seal, and/or combinations thereof.

17. The parallel axis gearbox of claim 16, wherein:

said spacer is compressed between said cap boss and said housing boss during assembly of said cap and said cover to said housing.

18. The parallel axis gearbox of claim 17, wherein:

said spacer is formed from one or more of a metal, a plastic, and/or a rubber; and said cover and said housing being formed of a metal.

* * * * *